United States Patent
Higaki et al.

(10) Patent No.: US 11,959,151 B2
(45) Date of Patent: *Apr. 16, 2024

(54) METHOD FOR SEPARATING COPPER FROM NICKEL AND COBALT

(71) Applicant: SUMITOMO METAL MINING CO., LTD., Tokyo (JP)

(72) Inventors: Tatsuya Higaki, Niihama (JP); Hiroshi Takenouchi, Niihama (JP); Hiroshi Kobayashi, Niihama (JP); Satoshi Asano, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 270 days.

This patent is subject to a terminal disclaimer.

(21) Appl. No.: 16/641,669

(22) PCT Filed: Aug. 21, 2018

(86) PCT No.: PCT/JP2018/030801
§ 371 (c)(1),
(2) Date: Feb. 25, 2020

(87) PCT Pub. No.: WO2019/064996
PCT Pub. Date: Apr. 4, 2019

(65) Prior Publication Data
US 2020/0216929 A1    Jul. 9, 2020

(30) Foreign Application Priority Data

Sep. 29, 2017    (JP) .................. 2017-191906

(51) Int. Cl.
C22B 15/00    (2006.01)
C22B 3/10    (2006.01)

(52) U.S. Cl.
CPC ............ *C22B 15/0052* (2013.01); *C22B 3/10* (2013.01); *C22B 15/0056* (2013.01)

(58) Field of Classification Search
CPC ........................................................ C22B 3/10
See application file for complete search history.

(56) References Cited

U.S. PATENT DOCUMENTS 3,793,429 A    2/1974 Queneau et al.
3,975,189 A    8/1976 Haugen
(Continued)

FOREIGN PATENT DOCUMENTS

CA    1327452 C    3/1994
CA    2360608 A1    5/2002
(Continued)

OTHER PUBLICATIONS

Espacenet machine translation of JP-2007323868-A retrieved on Mar. 6, 2022 (Year: 2007).*
(Continued)

*Primary Examiner* — Jophy S. Koshy
*Assistant Examiner* — Joshua S Carpenter
(74) *Attorney, Agent, or Firm* — Locke Lord LLP

(57) ABSTRACT

Provided is a method for separating copper from nickel and cobalt, which is capable of efficiently and selectively separating copper, and nickel and cobalt from an alloy containing copper, nickel and cobalt such as a highly anticorrosive alloy that is obtained by subjecting a waste lithium ion battery to a dry treatment and contains copper, nickel and cobalt. According to the present invention, an alloy containing copper, nickel and cobalt is brought into contact with an acid in the coexistence of a sulfurization agent, thereby obtaining a solid that contains copper and a leachate that contains nickel and cobalt.

4 Claims, 2 Drawing Sheets

(56) References Cited

U.S. PATENT DOCUMENTS

| | | | |
|---|---|---|---|
| 4,401,630 A | 8/1983 | Ettell et al. | |
| 6,440,194 B1 * | 8/2002 | Krofchak | C22B 7/04 423/43 |
| 2013/0269484 A1 | 10/2013 | Ishida et al. | |
| 2013/0287621 A1 | 10/2013 | Fujita et al. | |
| 2014/0174256 A1 * | 6/2014 | Takahashi | C22B 1/005 75/414 |
| 2014/0322109 A1 | 10/2014 | Nakai et al. | |

FOREIGN PATENT DOCUMENTS

| | | |
|---|---|---|
| CN | 1115338 A | 1/1996 |
| CN | 1172167 A | 2/1998 |
| CN | 101285127 A | 10/2008 |
| CN | 101298638 A | 11/2008 |
| CN | 101555556 A | 10/2009 |
| CN | 104911359 A | 9/2015 |
| CN | 105063349 A | 11/2015 |
| CN | 106505272 A | 3/2017 |
| EP | 0248518 A1 | 12/1987 |
| EP | 3690068 A1 | 8/2020 |
| JP | S57-131332 A | 8/1982 |
| JP | 663-259033 A | 10/1988 |
| JP | H09-82371 A | 3/1997 |
| JP | 2007-323868 A | 12/2007 |
| JP | 2007323868 A * | 12/2007 |
| JP | 2009-097076 A | 5/2009 |
| JP | 2010-277868 A | 12/2010 |
| JP | 2010277868 A * | 12/2010 |
| JP | 2012-001750 A | 1/2012 |
| JP | 2012-138301 A | 7/2012 |
| JP | 2012-172169 A | 9/2012 |
| JP | 2015-183292 A | 10/2015 |
| JP | 2016-102251 A | 6/2016 |
| KR | 10-2012-0045701 A | 5/2012 |
| WO | 2012/102384 A1 | 8/2012 |
| WO | 2013/077296 A1 | 5/2013 |

OTHER PUBLICATIONS

Buschow, K.H. et al. Encyclopedia of Materials—Science and Technology, vols. 1-11—Hydrometallurgical Principles. Elsevier. (2001). (Year: 2001).*

Dreisinger, David. "Copper leaching from primary sulfides: Options for biological and chemical extraction of copper." Hydrometallurgy 83.1-4 (2006): 10-20. (Year: 2006).*

Espacenet machine translation of JP-2010277868-A retrieved on Jan. 23, 2023 (Year: 2010).*

Kang, Jingu, et al. "Preparation of cobalt oxide from concentrated cathode material of spent lithium ion batteries by hydrometallurgical method." Advanced Powder Technology 21.2 (2010): 175-179 (Year: 2010).*

International Search Report dated Oct. 30, 2018, issued for PCT/JP2018/030801.

Physics, Chemistry, Liao Hept, Liao ning Person Press, Nov. 1987, p. 165. See the nature of sulphur, See the machine translation of the CN Office Action as a concise explanation of the relevance. (cited in the Aug. 30, 2021 Office action issued for CN201880056786.5.).

Office Action dated Aug. 30, 2021, issued in the related CN Patent Application No. 201880056786.5.

International Search Report including Written Opinion dated Nov. 20, 2018, issued for PCT/JP2018/033682.

Office Action issued in the KR Patent Application No. KR10-2020-7006158, dated Jun. 19, 2020.

Office Action issued in the CN Patent Application No. CN201880056267.9, dated Jul. 21, 2020.

Buschow, K.H. et al. "Hydrogen-Metal Systems: Hydride Forming Alloys," Encyclopedia of Materials—Science and Technology, vols. 1-11—Hydrometallurgical Principles. Elsevier. 2001, pp. 3970-3988.

Dreisinger, David. "Copper leaching from primary sulfides: Options for biological and chemical extraction of copper," Hydrometallurgy 83, 1-4, 2006, pp. 10-20.

Office Action issued in the U.S. Appl. No. 16/648,480, dated Jun. 26, 2020.

Office Action issued in the U.S. Appl. No. 16/648,480, dated Nov. 12, 2020.

International Search Report including Written Opinion issued in the International Application No. PCT/JP2018/033683 dated Nov. 6, 2018.

B. Friedrich et al. "Status and Trends of industrialized Li-Ion battery recycling processes with qualitative comparison of economic and environmental impacts", ICBR 2017 Lisbon, Sep. 21, 2017, pp. 1-19. (cited in the Apr. 22, 2021 Search Report issued for EP18860201.5 & cited in the May 12, 2021 Office Action issued for CA3072317).

Stefanova Vladislava et al., "Copper, Nickel and Cobalt Extraction from FeCuNiCoMn Alloy Obtained after Pyrometallurgical Processing of Deep Sea Nodules", Proceedings of the Tenth (2013) Isope Ocean Mining and Gas Hydrates Symposium, Sep. 22, 2013, pp. 180-184. (cited in the Apr. 22, 2021 Search Report issued for EP18860201.5 & cited in the May 11, 2021 Office Action issued for CA3077604).

J. Kang et al., "Preparation of cobalt oxide from concentrated cathode material of spent lithium ion batteries by hydrometallurgical method", Advanced Powder Technology, Elsevier BV, NL, vol. 21, No. 2, Mar. 1, 2010, pp. 175-179. (cited in the Apr. 22, 2021 Search Report issued for EP18860201.5 & cited in the Jun. 10, 2021 Search Report issued for EP18870066.0).

Extended European Search Report issued in the EP Patent Application No. 18860201.5, dated Apr. 22, 2021.

Office Action issued in the CA Patent Application No. 3077604, dated May 11, 2021.

Office Action issued in the CA Patent Application No. 3072317, dated May 12, 2021.

A. A. Palant et al., "Leaching Kinetics of the Magnetic Fraction of Converter Matte in Sulfuric Acid and Hydrochloric Acid Solutions", Russian Metallugry, vol. 2010, No. 12, Dec. 31, 2010, pp. 1110-1113. (cited in the Jun. 10, 2021 Search Report issued for EP18870066.0).

F. Huang et al., "Selective recovery of valuable metals from nickel converter slag at elevated temperature with sulfuric acid solution", Separation and Purification Technology, vol. 156, Oct. 23, 2015, pp. 572-581. (cited in the Jun. 10, 2021 Search Report issued for EP18870066.0).

Extended European Search Report issued in the EP Patent Application No. 18870066.0, dated Jun. 10, 2021.

Y. Xie et al., "Recovery of nickel, copper and cobalt from low-grade Ni—Cu sulfide tailings", Hydrometallurgy, Elsevier Scientific Publishing CY. Amsterdam, NL, vol. 80, No. 1-2, Nov. 1, 2005, pp. 54-58. (cited in the Jun. 10, 2021 Search Report issued for EP18871166.7).

Extended European Search Report issued in the EP Patent Application No. 18871166.7, dated Jun. 10, 2021.

International Search Report including Written Opinion issued in the International Application No. PCT/JP2018/043846 dated Jan. 29, 2019.

Extended European Search Report mailed on Feb. 12, 2024, issued in the EP Patent Application No. 23198073.1.

* cited by examiner

METHOD FOR SEPARATING COPPER FROM NICKEL AND COBALT

TECHNICAL FIELD

The present invention relates to a method for separating copper, nickel and cobalt from an alloy containing copper, nickel and cobalt.

BACKGROUND ART

A lithium ion battery (hereinafter, also referred to as "LIB") having characteristics of being lightweight and having a large output is mounted on a vehicle such as an electrical vehicle or a hybrid vehicle and an electronic device such as a mobile phone, a smart phone, or a personal computer.

The LIB has a structure in which a negative electrode material obtained by fixing a negative electrode active material such as graphite to a surface using a copper foil as a negative electrode current collector and a positive electrode material obtained by fixing a positive electrode active material such as lithium nickel oxide or lithium cobalt oxide to a positive electrode current collector formed from an aluminum foil are loaded inside an exterior can made of a metal such as aluminum or iron or made of plastic such as vinyl chloride together with a polypropylene separator formed from a porous resin film or the like, and an organic solvent containing an electrolyte such as lithium hexafluorophosphate ($LiPF_6$) is impregnated as an electrolytic solution.

When the LIB is assembled in a vehicle, an electronic device, or the like described above, and then used, the LIB eventually becomes unusable due to deterioration of an automobile, an electronic device, or the like, the lifetime of the LIB, and the like, and the LIB becomes a waste lithium ion battery (waste LIB). Further, the waste LIB is also generated as a defective product in production processing from the beginning in some cases.

Valuable components such as nickel, cobalt, and copper are contained in these waste LIBs, and it is desire to recover and recycle the valuable components for the purpose of effectively utilizing resources.

Generally, in a case where valuable components are tried to be efficiently recovered from devices, members, or materials formed by metals, a dry treatment using a dry smelting technique in which those devices, members, or materials formed by metals are put into a furnace or the like, are all melted at high temperature, and are separated into metals of valuables and slag to be thrown on the scrapheap or the like is considered as a shortcut method.

For example, Patent Document 1 discloses a method of recovering valuable metals using a dry treatment. By applying the method of Patent Document 1 to the waste LIB, a copper alloy containing nickel and cobalt can be obtained.

This dry treatment has a problem in that energy for heating to high temperature is required but has an advantage in that various impurities are treated by a simple process and can be collectively separated. Further, the obtained slag has a relatively stable chemical property, and thus also has advantages in that there is no concern that the slag causes environmental problems and the slag is easily thrown on the scrapheap.

However, in a case where the waste LIB is treated by the dry treatment, a problem arises in that some of valuable components, particularly, most of cobalt is distributed in slag, and the recovery loss of cobalt is not avoided.

Further, a metal obtained by the dry treatment is an alloy in which a valuable component coexists, and in order to recycle the metal, it is necessary to separate each of components from this alloy and to perform purification to remove impurities.

As a method for separating an element which has been generally used in the dry method, a method of performing separation, for example, between copper and lead or between lead and zinc by slowly cooling from a high-temperature melting state is mentioned. However, in a case where copper and nickel are main components as in the waste LIB, since copper and nickel have properties of uniformly melting in all composition ranges, even if slow cooling is performed, copper and nickel are only mixed and solidified in a layer shape and cannot be separated.

Furthermore, there is a purification method in which nickel is subjected to a disproportional reaction using carbon monoxide (CO) gas to volatilize and be separated from copper or cobalt, but since exceedingly poisonous CO gas is used, safety is difficult to secure.

Further, as a method for separating copper and nickel which has been industrially performed, a method of subjecting a mixed matte (sulfide) to crude separation is mentioned. This method generates a matte containing copper and nickel by a smelting process, this matte is slowly cooled in the same manner as in the aforementioned case, and thus the matte is separated into a sulfide containing a large amount of copper and a sulfide containing a large amount of nickel. However, even in this method, a problem arises in that, since separation between copper and nickel remains at the degree of crude separation, a separate step such as electrolytic purification is required in order to obtain high-purity nickel or copper.

As another method, a method of using a vapor pressure difference through a chloride has been also reviewed; however, this method is a process of handling a large amount of poisonous chlorine and thus there is a problem in that it cannot be said that this method is a method industrially suitable for device corrosion countermeasure, safety countermeasure, and the like.

Further, the same applies to separation between copper and cobalt and separation between cobalt and nickel.

As described above, as compared with a wet method, separation and purification of each element in the dry method has a drawback in that this method remains at a level of crude separation or is costly.

On the other hand, a wet treatment using a hydrometallurgical method using an acid or using a method such as neutralization or solvent extraction has merits that energy to be consumed is small, and valuable components to be mixed are individually separated and can be recovered directly with a high-purity grade.

However, in a case where the waste LIB is treated using the wet treatment, hexafluorophosphate anion of electrolytic solution components contained in the waste LIB is a refractory product which cannot be completely decomposed even at a high temperature and with a high-concentration sulfuric acid, and is mixed in an acid solution in which valuable components are leached. Further, since this hexafluorophosphate anion is a water-soluble carbonic ester, there are problems in that it is difficult to recover phosphorus or fluorine from the aqueous solution obtained after valuables are recovered and it is difficult to suppress discharging of hexafluorophosphate anion to public sea areas or the like by a drainage treatment.

Further, it is not easy to obtain a solution that can efficiently leach valuable components from the waste LIB with only an acid and then can be provided to purification. The waste LIB itself is difficult to leach, and when the leaching rate of the valuable components is insufficient or the waste LIB is forcedly leached using an acid having a strong oxidation power, there are problems in that components such as aluminum, iron, and manganese which are not recovery targets are leached in large quantity together with the valuable components, and the amount of a neutralizing agent added or the amount of drainage water to be handled for treating the components is increased.

Further, in a case where a pH of liquid is adjusted or impurities are neutralized to be immobilized in the precipitate for undergoing a separation means such as solvent extraction from an acidic leachate or ion exchange, the amount of neutralized precipitate generated is also increased, and thus there are many problems in terms of securement of treatment places, securement of safety, or the like.

Further, a charge may remain in the waste LIB, and when the waste LIB is tried to be treated in this state, there is a concern that heat generation, explosion, or the like is caused, and a burdensome treatment such as immersion in salt water to perform discharging is also required.

A method of treating a waste LIB using only a wet treatment in this way cannot always be also said a useful method.

In this regard, an attempt has been conducted in which the waste LIB, which is difficult to treat only with the dry treatment and the wet treatment mentioned above, is treated by a method of combining the dry treatment and the wet treatment, that is, the waste LIB is subjected to the dry treatment such as roasting to remove impurities as much as possible and obtain a uniform waste LIB processed material, and this processed material is subjected to the wet treatment to be separated into valuable components and other components.

In the method of combining the dry treatment and the wet treatment, fluorine or phosphorus of the electrolytic solution are volatilized by the dry treatment to be removed, and plastic that is a structural component of the waste LIB and a member made of an organic material such as a separator are decomposed.

However, a problem of the recovery loss caused by distributing cobalt contained in the waste LIB in slag through the dry treatment as described above still remains.

A method of distributing cobalt as a metal and performing reducing and melting so as to reduce distribution to the slag by adjusting atmosphere, temperature, reduction rate, and the like in the dry treatment is also considered; however, a problem arises in that the metal obtained by such a method forms a sparingly soluble and anticorrosive alloy containing nickel and cobalt using copper as a base this time, and even when the alloy is tried to be dissolved with an acid in order to separate and recover valuable components, the alloy is difficult to dissolve.

Further, for example, even when the above-described anticorrosive alloy is dissolved with an acid using chlorine gas, the obtained dissolved solution (leachate) contains high-concentration copper and relatively low-concentration nickel and cobalt. Of them, nickel and cobalt is separated using a known method such as solvent extraction without serious difficulty. However, it is not easy to separate a large amount of copper from nickel and cobalt with ease and at low cost.

As described above, it is difficult to efficiently separate only copper, nickel, and cobalt from a waste LIB containing various components, which are not recovery targets, in addition to copper, nickel and cobalt that are valuable components.

Incidentally, the aforementioned problems are present similarly in a case where copper, nickel and cobalt are separated from a waste battery containing copper, nickel, and cobalt other than the waste LIB and are also present similarly in a case where copper, nickel and cobalt are separated from an alloy containing copper, nickel and cobalt to be derived from those other than the waste battery.

Patent Document 1: Japanese Unexamined Patent Application, Publication No. 2012-172169
Patent Document 2: Japanese Unexamined Patent Application, Publication No. S63-259033

DISCLOSURE OF THE INVENTION

Problems to be Solved by the Invention

The present invention was made in view of such circumstances, and an object thereof is to provide a method for separating copper from nickel and cobalt, which is capable of efficiently and selectively separating copper, nickel and cobalt from an alloy containing copper, nickel and cobalt such as a highly anticorrosive alloy that is obtained by subjecting a waste lithium ion battery to a dry treatment and contains copper, nickel and cobalt.

Means for Solving the Problems

The present inventors have conducted intensive studies in order to solve the above-described problems. As a result, the present inventors have found that by bringing an alloy containing copper, nickel and cobalt into contact with an acid in the coexistence of a sulfurization agent, copper leached from the alloy containing copper, nickel and cobalt can be precipitated as copper sulfide (solid) and the leached nickel and cobalt can be allowed to remain in a leachate, so that copper, nickel and cobalt can be efficiently and selectively separated from the alloy containing copper, nickel and cobalt, thereby completing the present invention. That is, the present invention provides the following.

(1) A first invention of the present invention is a method for separating copper from nickel and cobalt, the method including bringing an alloy containing copper, nickel and cobalt into contact with an acid in the coexistence of a sulfurization agent to obtain a solid containing copper and a leachate containing nickel and cobalt.

(2) A second invention of the present invention is the method for separating copper from nickel and cobalt described in the first invention, in which the acid is hydrochloric acid.

(3) A third invention of the present invention is the method for separating copper from nickel and cobalt described in the first or second invention, in which the sulfurization agent is one or more kinds selected from sulfur, hydrogen sulfide gas, sodium hydrogen sulfide and sodium sulfide.

(4) A fourth invention of the present invention is the method for separating copper from nickel and cobalt described in any one of the first to third inventions, in which the acid and the sulfurization agent are brought into contact with the alloy containing copper, nickel and cobalt at the same time or the sulfurization agent is brought into contact with the alloy containing copper, nickel and cobalt and then the acid is brought into contact with the alloy.

(5) A fifth invention of the present invention is the method for separating copper from nickel and cobalt described in any one of the first to fourth inventions, in which the alloy containing copper, nickel and cobalt is an alloy obtained by melting and reducing scraps of a lithium ion battery.

(6) A sixth invention of the present invention is the method for separating copper from nickel and cobalt described in any one of the first to fifth inventions, in which the alloy containing copper, nickel and cobalt is a powdery material and a particle size of the alloy containing copper, nickel and cobalt is 300 μm or less.

(7) A seventh invention of the present invention is the method for separating copper from nickel and cobalt described in any one of the first to sixth inventions, in which the solid containing copper and the leachate containing nickel and cobalt are separated, and then copper remaining in the leachate containing nickel and cobalt is removed.

(8) An eighth invention of the present invention is the method for separating copper from nickel and cobalt described in the seventh invention, in which copper remaining in the leachate containing nickel and cobalt is removed by one or more methods selected from sulfurization, electrolytic winning and neutralization precipitation.

Effects of the Invention

According to the present invention, copper, nickel and cobalt can be efficiently and selectively separated from an alloy containing copper, nickel and cobalt, and for example, nickel and cobalt can be selectively separated from a sparingly soluble copper alloy, which is obtained by melting and reducing a waste lithium ion battery and contains nickel and cobalt, and can be efficiently and selectively separated from copper.

Further, nickel and cobalt separated from the alloy by the present invention can be separated by a known method and can be effectively recycled as metals or salts of high-purity nickel and cobalt, respectively. In addition, copper separated from the alloy is in the form of a sulfide suitable for copper smelting, and can be put directly into a converter furnace of a copper smelting furnace or the like and treated by a means such as electrolytic purification so that high-purity copper can be recovered.

PREFERRED MODE FOR CARRYING OUT THE INVENTION

Figure 1:
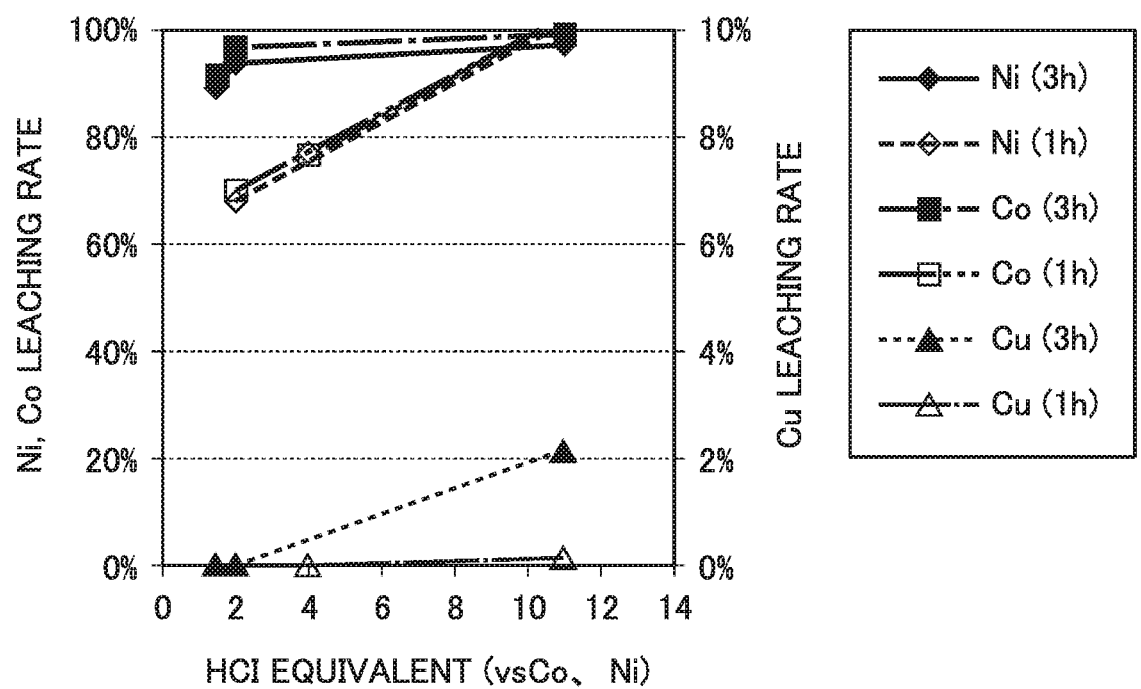
FIG. 1 is a diagram showing a relation between a hydrochloric acid equivalent added in the case of a leaching temperature of 95° C. and leaching rates of copper, nickel, and cobalt.

Hereinafter, embodiments of the present invention will be described. Incidentally, in the present specification, the notation "X to Y" (X and Y are arbitrary numerical values) means "X or more and Y or less."

A method for separating copper from nickel and cobalt according to this embodiment (hereinafter, simply referred to as "separating method") is a method for separating copper, nickel and cobalt from an alloy containing copper, nickel and cobalt (hereinafter, also simply referred to as "alloy"). Specifically, in this separating method, an alloy containing copper, nickel and cobalt is brought into contact with an acid in the coexistence of a sulfurization agent to obtain a solid containing copper and a leachate containing nickel and cobalt.

The treatment target of the separating method according to this embodiment is an alloy containing copper, nickel and cobalt. As the alloy, for example, an alloy obtained by melting and reducing a waste battery such as scraps of a lithium ion battery generated according to disposal of an automobile, an electronic device, or the like due to deterioration or the lifetime of the lithium ion battery (also referred to as "waste lithium ion battery"), that is, an alloy obtained by subjecting a waste battery to a dry treatment is exemplified.

Further, a material which is obtained by casting the alloy obtained by melting and reducing the waste battery, for example, in a plate shape may be a treatment target of the separating method of this embodiment. Further, a powdery material such as alloy powder obtained by applying an atomization method to the molten metal of the alloy obtained by melting and reducing the waste battery (hereinafter, this alloy powder is also referred to as "atomized powder" for descriptive purposes) may be a treatment target. Incidentally, the atomization method is a method of bringing the molten metal into contact with high-pressure gas or water to be scattered and rapidly cooled (solidified) to obtain powder. Other than that, a material which is drawn in a line shape and appropriately cut to be formed in a rod material may be a treatment target.

When the treatment target is a powdery material, the particle size of the alloy is approximately 300 μm or less, which is preferable since the alloy is easily treated. Meanwhile, when the particle size of the alloy is too small, since cost is increased and dust generation or ignition is caused, the particle size of the alloy is preferably approximately 10 μm or more.

The alloy obtained by subjecting the lithium ion battery to the dry treatment is a sparingly soluble and anticorrosive copper alloy and it is conventionally difficult to efficiently and selectively separate copper, nickel, and cobalt from this alloy, but by the separating method according to this embodiment, it is possible to efficiently and selectively separate copper, nickel, and cobalt.

Incidentally, the waste battery in the present specification means a defective product in production processing as well as a used battery. Further, it is sufficient to include a waste battery in the treatment target, and appropriate addition of other metals, resins, and the like other than the waste battery is not excluded. In this case, other metals and resins are included in the waste battery in the present specification.

In this embodiment, such an alloy is brought into contact with an acid in the coexistence of a sulfurization agent. According to this, copper leached from the alloy can be precipitated as a copper sulfide, thereby obtaining a solid containing copper. On the other hand, leached nickel and cobalt remain in the leachate. According to this, as described in Examples, copper, nickel and cobalt can be efficiently and selectively separated. Since copper is precipitated as a sulfide, it can be configured that most of copper does not exist in the leachate and nickel and cobalt exist at a very high ratio in an acidic solution (leachate). Therefore, according to the present invention, selectivity is very high and copper, nickel and cobalt can be separated from each other.

The reaction generated by bringing the alloy into contact with a sulfurization agent and an acid is represented in the following reaction formulas. In the following formulas, an example in which a solid sulfur (S) is used as the sulfurization agent and hydrochloric acid is used as the acid is described. As represented in the following formulas, the alloy is brought into contact with a sulfurization agent and reacted to generate a leached copper sulfide. Further, nickel and cobalt are leached with the acid and exist as ions in the leachate. Incidentally, even in a case where leached nickel and cobalt are reacted with the sulfurization agent to generate a sulfide, since the acid exists, sulfides of nickel and cobalt are decomposed and nickel and cobalt exist in the leachate.

Reaction Formulas $$Cu + S \rightarrow CuS \quad (1)$$

$$Ni + 2HCl \rightarrow NiCl_2 + H_2 \quad (2)$$

$$NiS + 2HCl \rightarrow NiCl_2 + H_2S \quad (2)'$$

$$Co + 2HCl \rightarrow CoCl_2 + H_2 \quad (3)$$

$$COS + 2HCl \rightarrow CoCl_2 + H_2S \quad (3)'$$

As the sulfurization agent, elemental sulfur can be used, but a liquid or gaseous sulfurization agent such as sodium hydrogen sulfide (hydrogenated sodium sulfide), sodium sulfide, or hydrogen sulfide gas may be used.

As the acid, acids such as hydrochloric acid, sulfuric acid, and nitric acid can be used singly or as a mixture. Further, chloride is contained in sulfuric acid and this may be used as an acid. When hydrochloric acid having a lower concentration than the sulfuric acid concentration in a sulfuric acid solution or a chloride, which does not affect the nickel/cobalt separation step that is the subsequent step, is added to the sulfuric acid solution, leaching can be more efficiently performed as compared with the case of using sulfuric acid singly, which is preferable. Further, in the case of using sulfuric acid, when oxygen, air, or an oxidizing agent such as hydrogen peroxide is added, leaching is promoted, which is preferable.

In the case of using hydrochloric acid or sulfuric acid as an acid, regarding the amount of the acid to be brought into contact with the alloy is, for example, the acid is used in an amount of 1 equivalent or more obtained by the above Formulas (2) and (3), or the like, preferably in an amount of 1.2 equivalent or more, and more preferably in an amount of 1.2 equivalent or more and 11 equivalent or less, with respect to the total amount of nickel and cobalt contained in the alloy. Incidentally, by increasing the acid concentration, the reaction rate can be increased.

Further, regarding the amount of the sulfurization agent, the sulfurization agent is used preferably in an amount of 1 equivalent or more obtained by the above Formula (1) with respect to the amount of copper contained in the alloy.

The ratio of the mass of the alloy to the concentration of a slurry obtained, for example, by adding an acid and a sulfurization agent to the alloy, that is, the volume of the slurry (the mass of the alloy containing copper, nickel and cobalt/the volume of the slurry) is preferably 20 g/l or more.

The reaction temperature is, for example, 50° C. or higher, preferably 75° C. or higher, and more preferably 95° C. or higher, and it is preferable to maintain the reaction temperature during the reaction. The reaction rate can be significantly increased at 95° C. or higher, for example, as compared with the reaction at lower than 75° C. Further, the reaction time is, for example, 1 to 6 hours.

Incidentally, it is preferable that the acid and the sulfurization agent are brought into contact with the alloy at the same time or the sulfurization agent is first brought into contact with the alloy and then the acid is brought into contact with the alloy. When the acid is brought into contact with the alloy in a state where the sulfurization agent does not exist, as in conventional cases, there is a case where the leaching rates of valuable components are not sufficient and components, which are not recovery targets, such as iron partially contained in the alloy are leached, there is a disadvantage in that a load in the subsequent purification step is increased.

The method of bringing an acid and a sulfurization agent into contact with the alloy is not particularly limited, and for example, the alloy or the sulfurization agent may be added to the acid and mixed, and as necessary, may be stirred. Further, in order to bring the sulfurization agent into contact with the alloy, a means for containing or applying a solid sulfurization agent into the alloy in the dry treatment may be used.

According to this embodiment, copper, nickel and cobalt can be separated from each other, but in a case where some of copper leached from the alloy remains in the leachate, when this copper is directly discharged from a leaching facility or the like, a load in the step of separating nickel and cobalt is increased, which is not preferable.

For this reason, a copper removing facility, which removes copper remaining in the leachate, may be provided at an outlet of a reaction tank in which the separating method of this embodiment is performed, copper removal may be completely performed, and the resultant product may be supplied to the step of separating nickel and cobalt. Examples of the method of removing copper remaining in the leachate include generation of the neutralized precipitate by addition of a sulfurization agent, electrolytic winning, or addition of a neutralizing agent.

As described above, by the method for separating copper from nickel and cobalt of this embodiment, copper in the alloy containing copper, nickel and cobalt is sulfurized to form a leach residue as a copper sulfide, and thus copper can be efficiently and selectively separated from nickel and cobalt remaining in the leachate.

Incidentally, the copper sulfide obtained by the method for separating copper from nickel and cobalt of this embodiment is supplied as a raw material of the existing copper smelting process without any changes to obtain an anode and this anode is subjected to electrolytic purification so that high-purity copper can be obtained.

Further, nickel and cobalt leached in the leachate are supplied to the existing nickel smelting process, nickel and cobalt are separated from each other using a means such as solvent extraction and subjected to electrolytic winning to obtain a nickel metal and a cobalt metal or to be purified as a nickel salt and a cobalt salt, so that nickel and cobalt can be recycled again as raw materials of a lithium ion battery.

EXAMPLES

Hereinafter, the present invention will be described in detail by means of Examples, but the present invention is not limited to the following Examples at all.

(Examples 1 to 14) Hydrochloric Acid

A waste lithium ion battery (waste LIB) was provided to a dry treatment of melting and reducing the waste LIB to obtain a molten metal of the alloy containing copper, nickel and cobalt, this molten metal was poured into a small crucible having a hole formed on the bottom surface, the molten metal flowing out from the hole was blown by high-pressure gas or water, and the molten metal was scattered and solidified, thereby obtaining an atomized powder. Further, the obtained atomized powder was subjected to sieving to obtain a powdery alloy powder having a particle size of 300 μm or less. The obtained alloy powder is analyzed using an ICP analyzer and results thereof are shown in Table 1.

Next, 1.0 g of the alloy powder was collected in each Example. Further, in each Example, 0.35 g of elemental sulfur (a solid of sulfur) that becomes 1 equivalent forming a copper sulfide represented by the above Formula (1) with respect to the copper grade in the alloy powder was prepared.

Further, in each Example, a solution obtained by fractionating hydrochloric acid in an amount of 1.5 equivalent to 11 equivalent that is calculated in the above Formula (2) and Formula (3) with respect to the total amount of nickel and cobalt contained in the alloy powder and then diluting the hydrochloric acid by 50 ml was prepared.

The respective solutions were heated to 50° C., 75° C., and 95° C., and each of 1.0 g of the alloy powder and each of 0.35 g of the sulfur were respectively added at the same time and stirred for 1 hour to 6 hours. After stirring for each time duration, filtration was performed to separate a solid and a liquid, the filtrate was analyzed using an ICP analyzer, and concentrations of respective components of copper, nickel, cobalt, iron, and sulfur were obtained. The above-described leaching conditions of respective Examples and ICP measurement results are shown in Table 2. In Table 2, the stirring time is described as "time" and the increasing temperature is described as "temperature". The mass of the filtration residue and the fluid volume, pH, and oxidation-reduction potential ORP (based on silver/silver chloride electrode) after filtration are measured and results thereof are also shown in Table 2. Further, leaching rates of respective elements of copper, nickel, cobalt, and iron are obtained and results thereof are shown in Table 3. The leaching rate was obtained by dividing the mass of a target element in the filtrate by the mass of the target element in the atomized powder. Further, a relation between a hydrochloric acid equivalent added in the case of a leaching temperature of 95° C. and leaching rates of copper, nickel, cobalt is shown in FIG. 1 and a relation between a hydrochloric acid equivalent added in the case of a leaching temperature of 75° C. and leaching rates of copper, nickel, cobalt is shown in FIG. 2.

Figure 2:
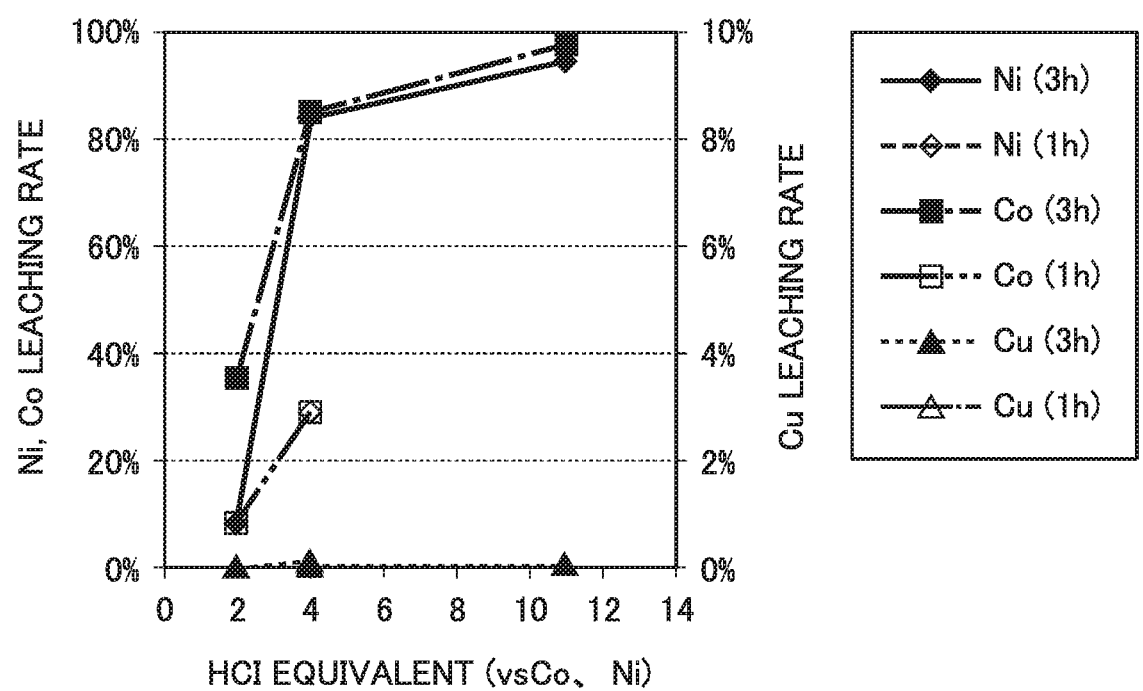
FIG. 2 is a diagram showing a relation between a hydrochloric acid equivalent added in the case of a leaching temperature of 75° C. and leaching rates of copper, nickel, and cobalt.

As shown in Tables 2 and 3 and FIGS. 1 and 2, in Examples 1 to 14, even when the reaction temperature, the hydrochloric acid amount, and the reaction time were changed, the leaching rate of copper was suppressed to 2.2% or less, and depending on the reaction temperature, the hydrochloric acid amount, and the reaction time, the leaching rate of copper was suppressed to less than 1%. On the other hand, the leaching rates of nickel, cobalt, and iron were considerably higher than the leaching rate of copper in each Example, and depending on the reaction temperature, the hydrochloric acid amount, and the reaction time, 90% or more thereof was leached. From these results, it was possible to confirm that by bringing an alloy containing copper, nickel and cobalt into contact with hydrochloric acid in the coexistence of a sulfurization agent, copper is precipitated as a copper sulfide, nickel and cobalt are selectively leached in the leachate, and thus copper, nickel and cobalt can be efficiently and selectively separated from the alloy.

TABLE 1

|  | ICP analytical value (%) | | | | | |
| --- | --- | --- | --- | --- | --- | --- |
|  | Cu | Ni | Co | Fe | Mn | S |
| Atomized powder | 76% | 12% | 12% | 1.5% | 0.06% | <0.1% |

TABLE 2

| | Atomized powder (g) | HCl (11.64N) | | | S | | | | | After filtration | | | | | | | |
| --- | --- | --- | --- | --- | --- | --- | --- | --- | --- | --- | --- | --- | --- | --- | --- | --- | --- |
| | | Equivalent (vsCo, Ni) | Fluid volume (ml) | | Equivalent (vsCu) | Amount (g) | Time (hr) | Temperature (° C.) | Residue (g) | Fluid volume (ml) | pH | ORP (mV) | Filtrate: ICP analytical value(g/l) | | | | |
| | | | | | | | | | | | | | Cu | Ni | Co | Fe | S |
| Example 1 | 1.0 | 11 | 7.8 | | 1 | 0.35 | 3 | 75 | 0.94 | 45 | −0.3 | 245 | 0.002 | 2.52 | 2.6 | 0.31 | 1.44 |
| Example 2 | 1.0 | 11 | 7.8 | | 1 | 0.35 | 3 | 95 | 0.96 | 44.5 | −0.27 | 261 | 0.37 | 2.63 | 2.68 | 0.32 | 0.002 |
| Example 3 | 1.0 | 2 | 1.44 | | 1 | 0.35 | 3 | 95 | 0.98 | 44 | 0.81 | 274 | 0.002 | 2.56 | 2.64 | 0.32 | 0.017 |
| Example 4 | 1.0 | 2 | 1.44 | | 1 | 0.35 | 1 | 95 | 1.09 | 47.5 | 0.75 | 120 | 0.0002 | 1.72 | 1.78 | 0.22 | 0.004 |
| Example 5 | 1.0 | 11 | 7.8 | | 1 | 0.35 | 1 | 95 | 1.01 | 50 | −0.21 | 401 | 0.019 | 2.43 | 2.46 | 0.29 | 0.002 |
| Example 6 | 1.0 | 11 | 7.8 | | 1 | 0.35 | 6 | 95 | 0.83 | 43.5 | −0.27 | 247 | 2.43 | 2.74 | 2.75 | 0.32 | 0.004 |
| Example 7 | 1.0 | 11 | 7.8 | | 1 | 0.35 | 3 | 50 | — | 46 | −0.41 | 98 | 0.010 | 0.72 | 0.74 | 0.095 | 0.029 |
| Example 8 | 1.0 | 11 | 7.8 | | 1 | 0.35 | 6 | 50 | 1.18 | 46 | −0.25 | 290 | 0.001 | 1.53 | 1.54 | 0.19 | 0.047 |
| Example 9 | 1.0 | 4 | 2.88 | | 1 | 0.35 | 1 | 95 | 1.05 | 46.5 | 0.34 | 259 | 0.0004 | 1.98 | 1.98 | 0.25 | 0.003 |
| Example 10 | 1.0 | 1.5 | 1.08 | | 1 | 0.35 | 3 | 95 | 1.01 | 44.5 | 1.13 | 244 | 0.001 | 2.41 | 2.47 | 0.31 | 0.009 |
| Example 11 | 1.0 | 2 | 1.44 | | 1 | 0.35 | 1 | 75 | — | 47 | — | — | 0.004 | 0.21 | 0.21 | 0.032 | 0.019 |
| Example 12 | 1.0 | 2 | 1.44 | | 1 | 0.35 | 3 | 75 | 1.23 | 47 | 0.65 | 172 | 0.0004 | 0.90 | 0.91 | 0.12 | 0.044 |
| Example 13 | 1.0 | 4 | 2.88 | | 1 | 0.35 | 1 | 75 | — | 47 | — | — | 0.019 | 0.74 | 0.74 | 0.095 | 0.020 |
| Example 14 | 1.0 | 4 | 2.88 | | 1 | 0.35 | 3 | 75 | 1.07 | 47 | −0.35 | 252 | 0.0001 | 2.14 | 2.17 | 0.26 | 0.021 |

TABLE 3

|  | Leaching rate (filtrate/atomized powder) | | | |
| --- | --- | --- | --- | --- |
|  | Cu | Ni | Co | Fe |
| Example 1 | 0.0% | 95% | 98% | 93% |
| Example 2 | 2.2% | 98% | 99% | 95% |
| Example 3 | 0.0% | 94% | 97% | 94% |
| Example 4 | 0.0% | 68% | 70% | 70% |
| Example 5 | 0.1% | 100% | 100% | 97% |
| Example 7 | 0.1% | 28% | 28% | 29% |
| Example 8 | 0.0% | 59% | 59% | 58% |
| Example 9 | 0.0% | 77% | 77% | 78% |
| Example 10 | 0.0% | 89% | 92% | 92% |
| Example 11 | 0.0% | 8% | 8% | 10% |
| Example 12 | 0.0% | 35% | 36% | 38% |
| Example 13 | 0.1% | 29% | 29% | 30% |
| Example 14 | 0.0% | 84% | 85% | 81% |

(Comparative Example 1) Hydrochloric Acid 1.0 g of alloy powder having a particle size of 300 μm or less obtained in the same manner as in Example 1 was collected. Next, a solution obtained by diluting hydrochloric acid in an amount of 3.7 equivalent with respect to the total amount of nickel and cobalt contained in the alloy powder by 15 ml was prepared and this solution was heated to 75° C.

Next, 1.0 g of the alloy powder was added and stirred for 2 hours. Thereafter, filtration was performed to separate a solid and a liquid, the filtrate was analyzed using an ICP analyzer, and concentrations of respective components of copper, nickel, cobalt, iron, and sulfur were obtained. The above-described leaching conditions and ICP measurement results are shown in Table 4. The fluid volume after filtration is measured and results thereof are also shown in Table 4.

Further, leaching rates of respective elements of copper, nickel, cobalt, and iron are obtained and results thereof are shown in Table 5.

As a result, as shown in Tables 4 and 5, the leaching rates of all of copper, nickel, cobalt, and iron were from about 50% to 60%, these were not sufficient values as leaching rates of valuable components, the respective elements were merely leached uniformly at the same time, and separation between valuable components and unnecessary recovery components was also not sufficient.

TABLE 4

| Atomized powder (g) | HCl (11.64N) Equivalent (vsCo, Ni) | HCl (11.64N) Fluid volume (ml) | S Equivalent (vsCu) | S Amount (g) | Time (hr) | Temperature (°C) | Residue (g) | After filtration Fluid volume (ml) | pH | ORP (mV) | Filtrate: ICP analytical value (g/l) Cu | Ni | Co | Fe | S |
|---|---|---|---|---|---|---|---|---|---|---|---|---|---|---|---|
| Comparative Example 1 | 1.0 | 3.7 | 2.6 | — | — | 2 | 75 | — | 12 | — | — | 31 | 6.0 | 6.1 | 0.76 | — |

TABLE 5

| | Leaching rate (filtrate/atomized powder) | | | |
|---|---|---|---|---|
| | Cu | Ni | Co | Fe |
| Comparative Example 1 | 49% | 60% | 61% | 61% |

The invention claimed is:

1. A separation method for separating copper, nickel and cobalt from an alloy obtained by melting and reducing a waste lithium ion battery, the method comprising
producing the alloy in the form of an alloy powder, the alloy powder containing a copper metal, a nickel metal, and a cobalt metal;
adding a sulfurization agent to the alloy powder to establish a state of the sulfurization agent and the alloy powder coexisting;
wherein the sulfurization agent is one or more selected from the group consisting of elemental sulfur, hydrogen sulfide gas, sodium hydrogen sulfide and sodium sulfide; and
bringing the sulfurization agent and the alloy powder coexisting into contact with hydrochloric acid whereby the nickel metal and the cobalt metal are leached from the alloy powder and the copper metal contained in the alloy powder is sulfurized by the sulfurization agent to obtain a solid containing copper sulfide and a leachate containing the nickel existing as an ion and the cobalt existing as an ion.

2. The separation method according to claim 1, wherein the alloy powder has a particle size of 300 μm or less.

3. The separation method according to claim 1, wherein the solid containing the copper sulfide and the leachate containing the nickel and the cobalt are separated, and then copper remaining in the leachate is removed.

4. The separation method according to claim 3, wherein a copper remaining in the leachate is removed by one or more methods selected from sulfurization, electrolytic winning and neutralization precipitation.

\* \* \* \* \*